Figure 1:
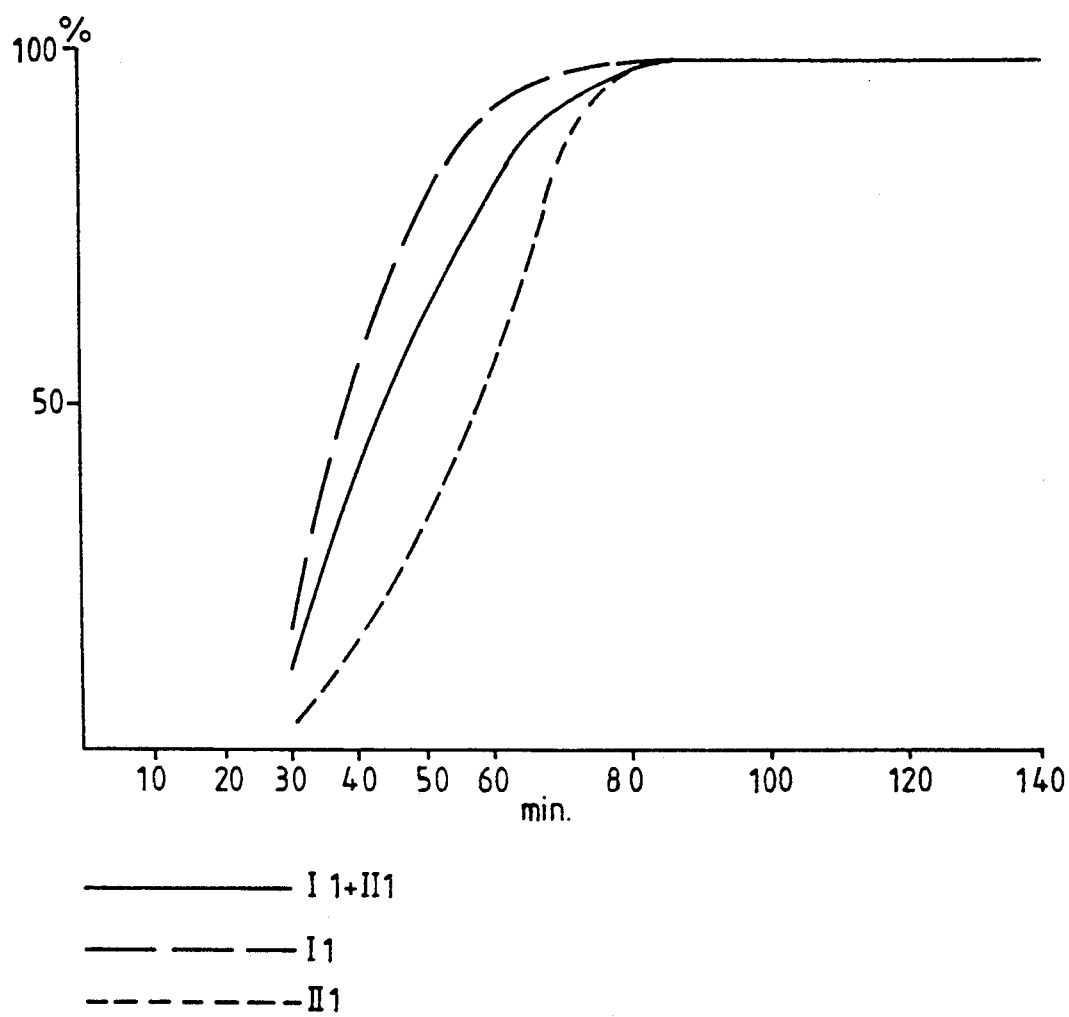

United States Patent

Schwarz et al.

Patent Number: 5,304,221
Date of Patent: Apr. 19, 1994

[54] REACTIVE DYESTUFF MIXTURES

[75] Inventors: Max Schwarz, Leverkusen; Joachim Grütze, Odenthal; Dietrich Hildebrand, Odenthal; Joachim Wolff, Odenthal; Frank Stöhr, Odenthal, all of Fed. Rep. of Germany

[73] Assignee: Bayer Aktiengesellshaft, Leverkusen, Fed. Rep. of Germany

[21] Appl. No.: 981,975

[22] Filed: Nov. 25, 1992

[30] Foreign Application Priority Data

Dec. 9, 1991 [DE] Fed. Rep. of Germany ....... 4140541

[51] Int. Cl.$^5$ .............................................. C09B 42/00
[52] U.S. Cl. ............................................ 8/549; 8/639; 8/641
[58] Field of Search .................... 8/249, 529, 549, 639, 8/641

[56] References Cited

U.S. PATENT DOCUMENTS

| | | | |
|---|---|---|---|
| 4,338,093 | 7/1982 | Hildebrand et al. | 8/549 |
| 4,557,731 | 12/1985 | Sasakura et al. | 8/531 |
| 4,988,803 | 1/1991 | Stohr et al. | 534/635 |
| 5,047,067 | 9/1991 | Miyazaki et al. | 8/549 |
| 5,131,917 | 7/1992 | Miyamoto et al. | 8/549 |

FOREIGN PATENT DOCUMENTS 1-170665 7/1989 Japan.

*Primary Examiner*—Paul Lieberman
*Assistant Examiner*—Margaret Einsmann
*Attorney, Agent, or Firm*—Sprung, Horn, Kramer & Woods

[57] ABSTRACT

New dyestuff mixtures contain in each case at least one fluoropyrimidine dyestuff of the general formula (I)

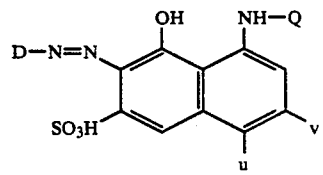

and a vinylsulfonyl dyestuff of the formula (II)

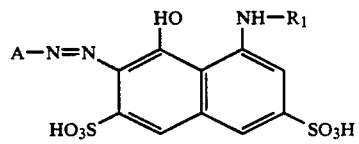

in which the substituents have the meaning given in the description.

7 Claims, 1 Drawing Sheet

REACTIVE DYESTUFF MIXTURES

The invention relates to mixtures of reactive dyestuffs which show improved exhaustion properties compared with the individual components in the dyeing of cellulose or regenerated cellulose fibres.

Reactive dyestuffs are used for the dyeing of cellulose fibres in the form of their individual components or in the form of mixtures of different dyestuffs. In the mixtures, the reactivities of the individual components of the mixture should, if possible, be identical or at least similar in order to ensure compatibility of the dyestuffs during the dyeing process and thus to achieve a solid, level appearance of the goods. If reactive dyestuffs have greatly different reactivities, they are regarded as belonging to ranges of dyestuffs which are different from one another and must be applied using different alkali and temperature conditions. Due to the difference in reactivity, the reactive dyestuffs are divided according to today's usage into three groups: highly reactive reactive dyestuffs which can be dyed at a temperature as low as less than 40° C. are designated as cold-dyeing dyestuffs. Dyestuffs which are applied at 40° to 60° C. are designated as warm-dyeing dyestuffs, and dyestuffs which are applied at around 80° C. as hot-dyeing dyestuffs. Due to their difference in reactivity and substantivity, the three groups of ranges of dyestuffs of different reactivity are applied using procedures which are typical of the group.

For example, the difference between the application of a warm-dyeing dyestuff and of a hot-dyeing dyestuff consists in a dyeing temperature which is 20° to 40° C. higher in the case of the hot-dyeing dyestuff, in an electrolyte concentration which is higher by 40 g/l of common salt and in a sodium carbonate concentration of the dyebath which is higher by 10 g/l.

Dyestuff mixtures are already disclosed in EP-A-478,503.

The object of the invention is to provide a brilliant reactive dyestuff mixture which shows a uniform shape of the fixation curve which is superior to that of the individual dyestuff, in combination with a high fixation yield.

The invention relates to a dyestuff mixture of dyestuffs which preferably result in dyeings having the same shade, characterised in that in each case at least one fluorotriazine dyestuff and/or fluoropyrimidine dyestuff of the general formula (I)

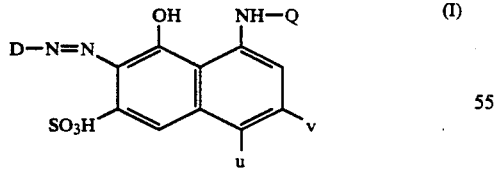

(I)

and a vinylsulfonyl dyestuff of the formula (II)

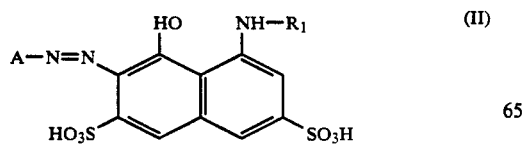

(II)

are present in which

A denotes

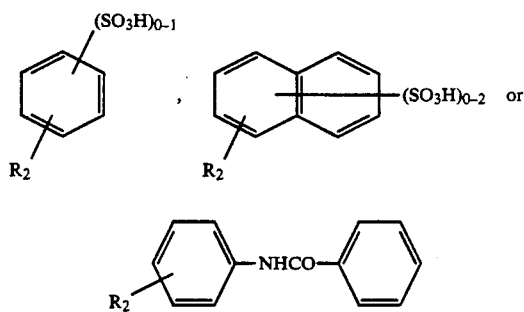

D denotes

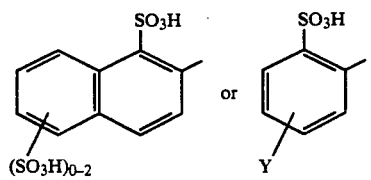

Q denotes

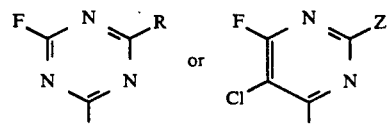

each Y denotes, independently of the others, H, $-SO_2-C_2H_4-O-SO_3H$ or $-SO_2-CH=CH_2$,
Z denotes F or H,
u, v denote H or $SO_3H$, u being different from v,
R denotes

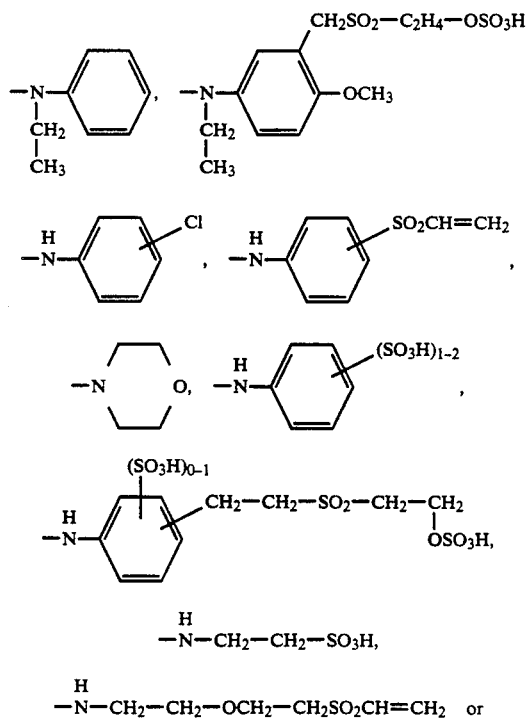

-continued $-\underset{H}{N}-(CH_2)_3-SO_2-CH_2-CH_2-OSO_3H$

R¹ denotes

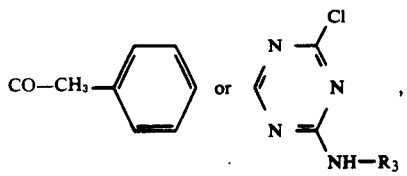

R₂ denotes $HO_3SOCH_2-CH_2-O_2S-$, $-SO_2-CH=CH_2$ and

R₃ denotes

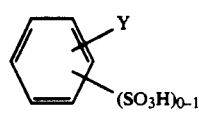

Particularly preferred compounds (I) are:

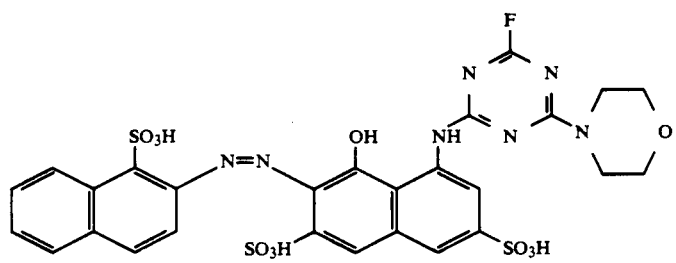
(I.1)

and (I.2)

A particularly preferred compound (II) is:

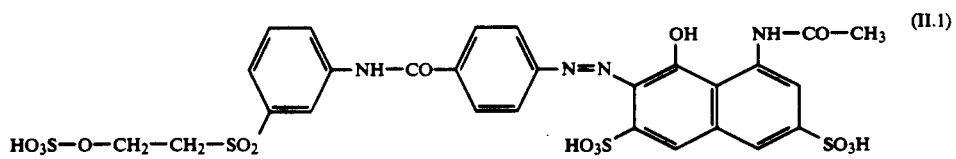
(II.1)

In a preferred embodiment of the invention, 10 to 90 parts by weight of I and 90 to 10 parts by weight of II, in particular 30 to 70 parts by weight of the dyestuff I and 70 to 30 parts by weight of the dyestuff II are present, relative to the mixture of dyestuffs I and II.

The dyestuff mixture can contain the customary additives; preferably, it contains, per 100 parts by weight of reactive dyestuff mixture 1 to 50 parts by weight of an inorganic salt, 1 to 5 parts by weight of an inorganic buffer, 0.5 to 10 parts by weight of an organic anionic dispersant and 0.5 to 5 parts by weight of a dust proofing agent.

The dyestuff mixture in which the individual components have greatly different reactivity produces level dyeings in combination with a high fixation yield and a very uniform fixation behaviour. Brilliant red dyeings are obtained.

The dyestuff mixture can preferably be used for the dyeing of cotton and other cellulose fibres by the exhaust method on customary dyeing machines.

Dyeing temperatures of 40° C. to 80° C. are possible, the preferred dyeing temperature is 60° C., and the preferred starting temperature 30° C.

Preferably, dyeing is carried out by the following sequence

| Time (Min) | Temperature (°C.) | Measure |
| --- | --- | --- |
| 0 | 30 | |
| 10 | 30 | Addition of salt, in particular sodium sulphate, common salt |
| 30 | 30 | Addition of fixing agent, in particular sodium carbonate, sodium hydroxide solution |
| 30 | 30 → 60 | Heating to 60° C. |

COMPARATIVE EXAMPLE

If dyeing is carried out by this dyeing scheme using the individual dyestuffs of the dyestuff mixtures, the fixation curves shown in FIG. 1 are obtained. In these curves, the fixed dyestuff on the fibre is plotted in % of the final fixation as a function of time.

The reactive dyestuff (formula I) immediately starts reacting with the cellulose fibre at 30° C. after addition of the fixing agent. As soon as the main reaction slows down, the heating phase to the final temperature of 60° C. is started, during which a renewed acceleration of the reaction is observed.

Shortly after reaching 60° C, the fixation curve changes to the horizontal portion; the dyeing is complete.

The less reactive dyestuff (formula II) first reacts slowly with the fibre under the selected conditions. However, during the heating phase a significant increase in the reaction rate sets in.

EXAMPLE ACCORDING TO THE INVENTION 1000 parts of an aqueous dye liquor are entered at 30° C. with 100 parts of cotton knitted goods, and 2 parts of reactive dyestuff mixture are added. This mixture consists of 1 part each of the dyestuff of the formula (I) and the dyestuff of formula (II).

After uniform distribution of the dyestuff mixture in the liquor and on the cotton, 50 parts of sodium chloride are added to the dye liquor, and 20 parts of sodium carbonate are then added. While vigorously agitating the liquor and the goods, the dye liquor is heated to 60° C. over a period of 30 minutes and left at this temperature for 90 minutes.

The liquor is then discharged, and the goods are rinsed twice at 50° C. and twice at 80° C. They are then soaped at the boil for 15 minutes and rinsed in the cold. This gives a brilliant red dyeing having good fastness properties.

In the mixture, the individual components show more harmonious exhaustion properties than would be expected from their respective dyestuff types, which is apparent from the exhaustion curve which is flatter than the exhaustion curve of I and steeper than the exhaustion curve II, i.e. the less reactive dyestuff (formula II) is fixed in the claimed mixture (I+II), at the same fixation conditions more rapidly than corresponds to its fixation behaviour as standard.

It is unexpected and surprising that the dyestuffs mixed with one another show the same fixation curve, which is a measure for the positive mutual influencing of the dyestuffs.

Furthermore, it is surprising that the more reactive mixing component dyes the material uniformly and in a high yield despite the fact that the selected fixation conditions seem to be too demanding. On the other hand, the less reactive mixing component gives good final yields, despite reaction conditions which seem to be too "mild".

We claim:

1. Dyestuff mixture of at least two reactive dyestuffs, comprising at least one fluoropyrimidine dyestuff of the formula (I)

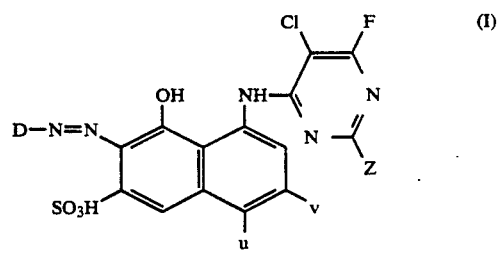

and a vinylsulfonyl dyestuff of the formula (II)

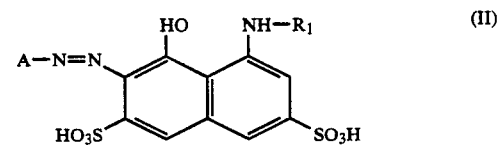

in which

A denotes

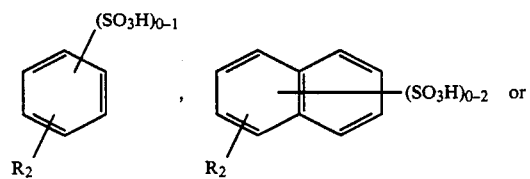

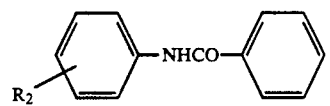

D denotes

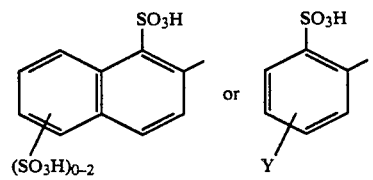

each Y denotes, independently of the others, H, $-SO_2-C_2H_4-O-SO_3H$ or $-SO_2-CH=CH_2$, Z denotes F or H, u and v denote H or $SO_3H$, u being different from v, $R_1$ denotes $CO-CH_3$,

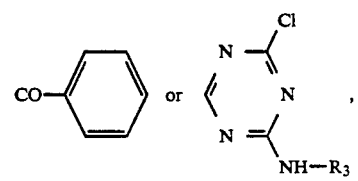

$R_2$ denotes $HO_3SOCH_2-CH_2-O_2S-$ or $-SO_2-CH=CH_2$ and $R_3$ denotes

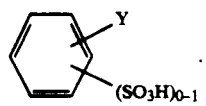

2. Mixture according to claim 1, wherein the mixture contains 20 to 80 parts by weight of the dyestuff of the formula (I) and 80 to 20 parts by weight of the dyestuff of the formula (II).

3. Mixture according to claim 1, wherein the dyestuff mixture contains 1 to 50 parts by weight of an inorganic salt in 100 parts by weight of mixed dyestuff.

4. Mixture according to claim 1, wherein 100 parts by weight of the mixed dyestuff contain 1 to 5 parts by weight of an inorganic buffer producing a pH of 6.5 to 7.5.

5. Mixture according to claim 1, wherein the mixture contains 0.5 to 10 parts by weight of an organic anionic dispersing agent.

6. Mixture according to claim 1, wherein the mixture contains 0.5 to 5 parts by weight of a dust-proofing agent.

7. Process for the dyeing of cellulose fibres and cellulose blended fibres with a mixture of reactive dyestuffs, wherein a mixture according to claim 1 is used.

* * * * *